(12) United States Patent  (10) Patent No.: US 8,554,406 B2
Avian  (45) Date of Patent: Oct. 8, 2013

(54) METHOD FOR COMMUNICATION BETWEEN TWO AUTOMOTIVE ELECTRONIC CONTROL UNITS AND ASSOCIATED DEVICE

(75) Inventor: Philippe Avian, Goyrans (FR)

(73) Assignee: Continental Automotive France, Toulouse (FR)

( * ) Notice: Subject to any disclaimer, the term of this patent is extended or adjusted under 35 U.S.C. 154(b) by 112 days.

(21) Appl. No.: 13/147,685

(22) PCT Filed: Jan. 28, 2010

(86) PCT No.: PCT/EP2010/000512
§ 371 (c)(1),
(2), (4) Date: Aug. 23, 2011

(87) PCT Pub. No.: WO2010/091787
PCT Pub. Date: Aug. 19, 2010

(65) Prior Publication Data
US 2011/0301805 A1    Dec. 8, 2011

(30) Foreign Application Priority Data
Feb. 13, 2009 (FR) ..................................... 09 00647

(51) Int. Cl.
*G06F 7/00* (2006.01)
(52) U.S. Cl.
USPC .............. 701/36; 370/225; 709/224; 710/312
(58) Field of Classification Search
USPC ........ 701/31, 36; 370/225; 709/224; 710/312
See application file for complete search history.

(56) References Cited

U.S. PATENT DOCUMENTS 4,627,045 A * 12/1986 Olson et al. .................. 370/225
5,153,874 A    10/1992 Kohno
5,784,547 A *  7/1998 Dittmar et al. ................ 714/4.5
(Continued)

FOREIGN PATENT DOCUMENTS

EP    1 069 733 A2    1/2001
EP    1 359 057 A2    11/2003
(Continued)

OTHER PUBLICATIONS

Fault tolerant TTCAN networks, Muller et al., Robert Bosch GmbH, 2002.*
International Search Report, dated Mar. 9, 2010, from corresponding PCT application.

*Primary Examiner* — Mary Cheung
*Assistant Examiner* — Michael Berns
(74) *Attorney, Agent, or Firm* — Young & Thompson

(57) ABSTRACT

A method of communication between at least two automotive electronic control units, including two communication interfaces between the units enabling messages to be sent via one or the other of the interfaces, the units each including a microcontroller linked to the interfaces managing sending and receiving of the messages according to a given priority level, transmission speed and recurrence, and including a diagnostic system for checking the functionality of the interfaces, a message scheduler, the method including: introducing a logic switch into each microcontroller, for selecting one or the other interface; checking that neither interface is defective; scheduling by the scheduler the sending of messages in succession via one or the other of the interfaces; selecting one or the other of the interfaces to send the messages scheduled by the message scheduler; and sending the scheduled messages in succession by one or the other of the interfaces.

20 Claims, 4 Drawing Sheets

(56) References Cited

U.S. PATENT DOCUMENTS

| | | |
|---|---|---|
| 6,202,115 B1 * | 3/2001 | Khosrowpour ............... 710/312 |
| 7,257,629 B2 * | 8/2007 | Manzardo ..................... 709/224 |
| 7,616,560 B2 * | 11/2009 | Fuehrer et al. ................ 370/225 |
| 2009/0044041 A1 * | 2/2009 | Armbruster et al. ............. 714/3 |

FOREIGN PATENT DOCUMENTS

| | | |
|---|---|---|
| EP | 1763454 B1 * | 7/2008 |
| WO | 85/03825 A1 | 8/1985 |
| WO | WO 2007017787 A2 * | 2/2007 |

* cited by examiner

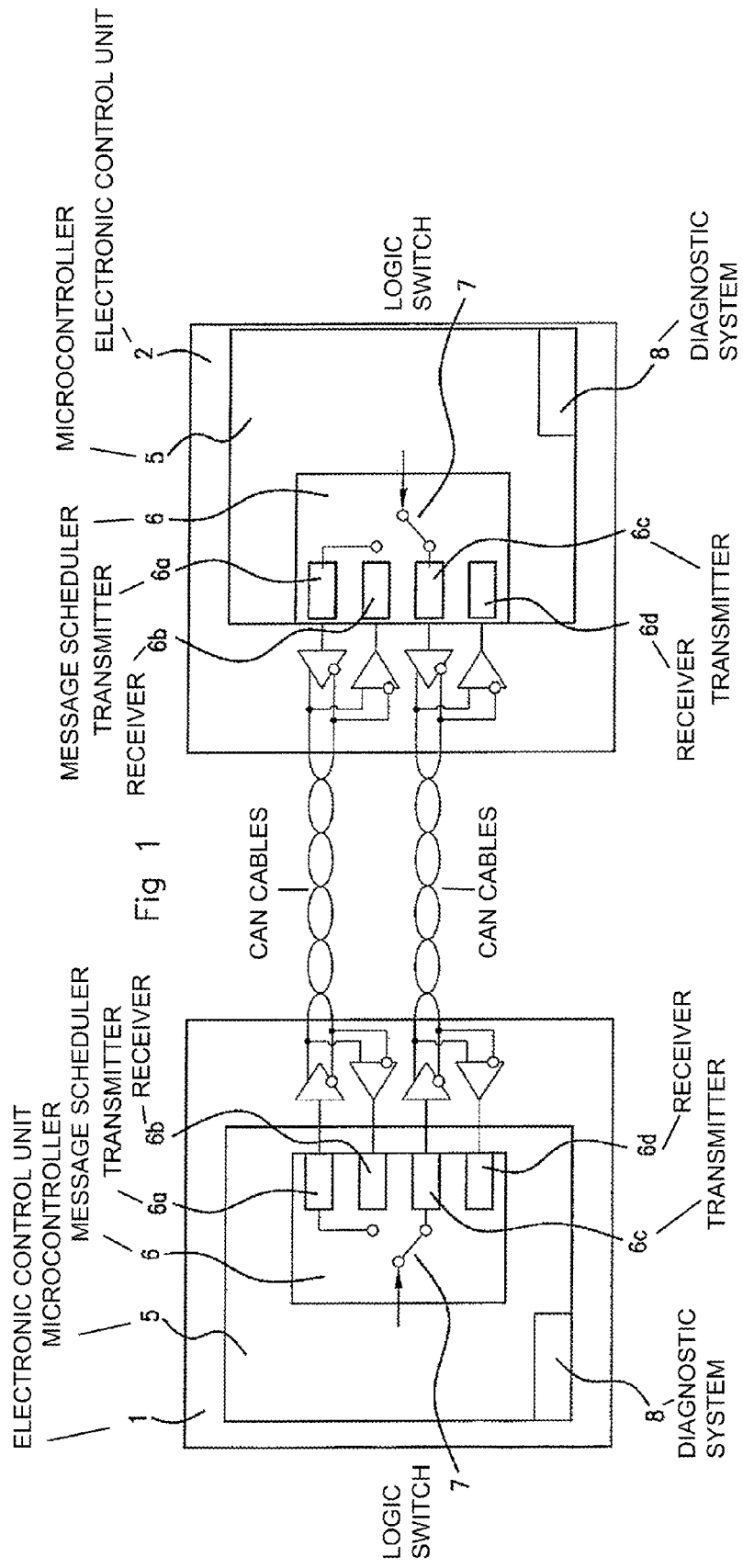

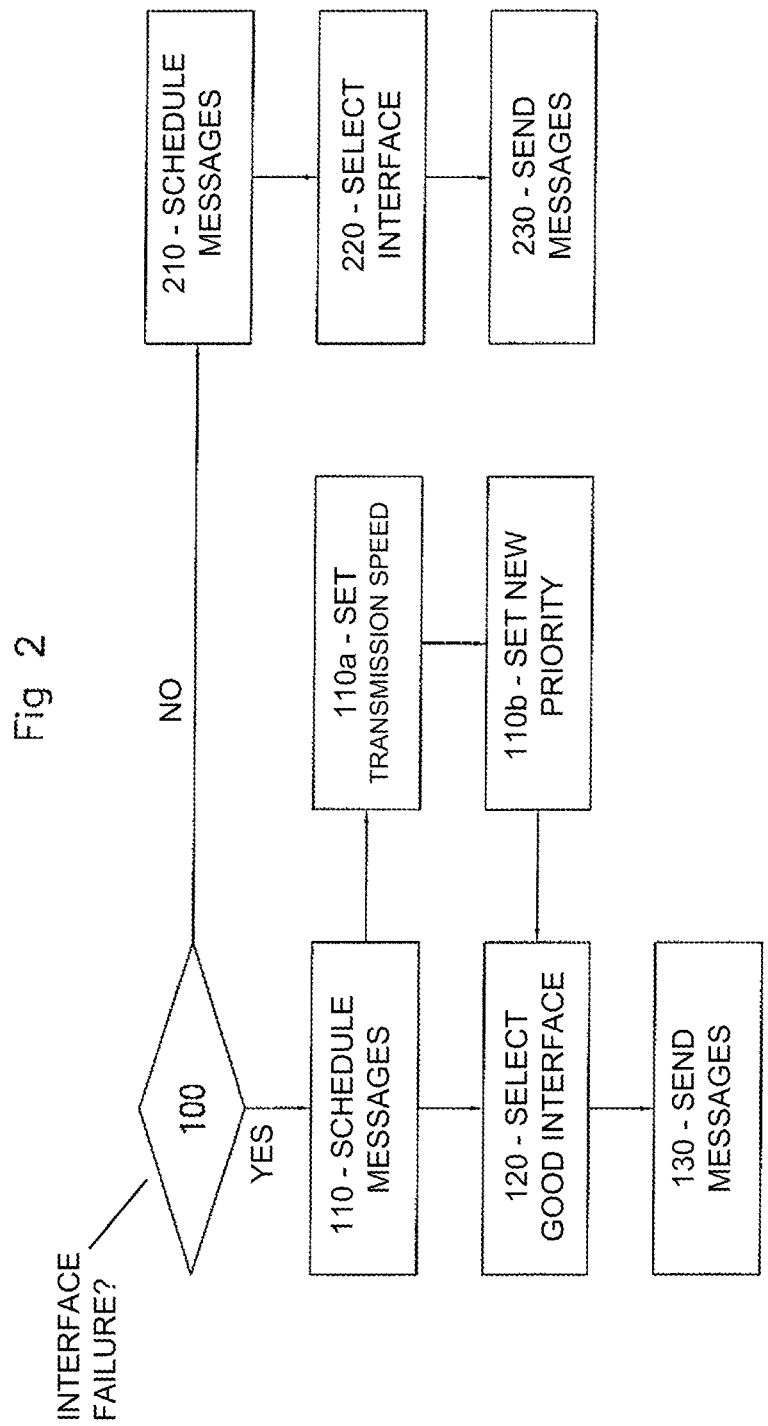

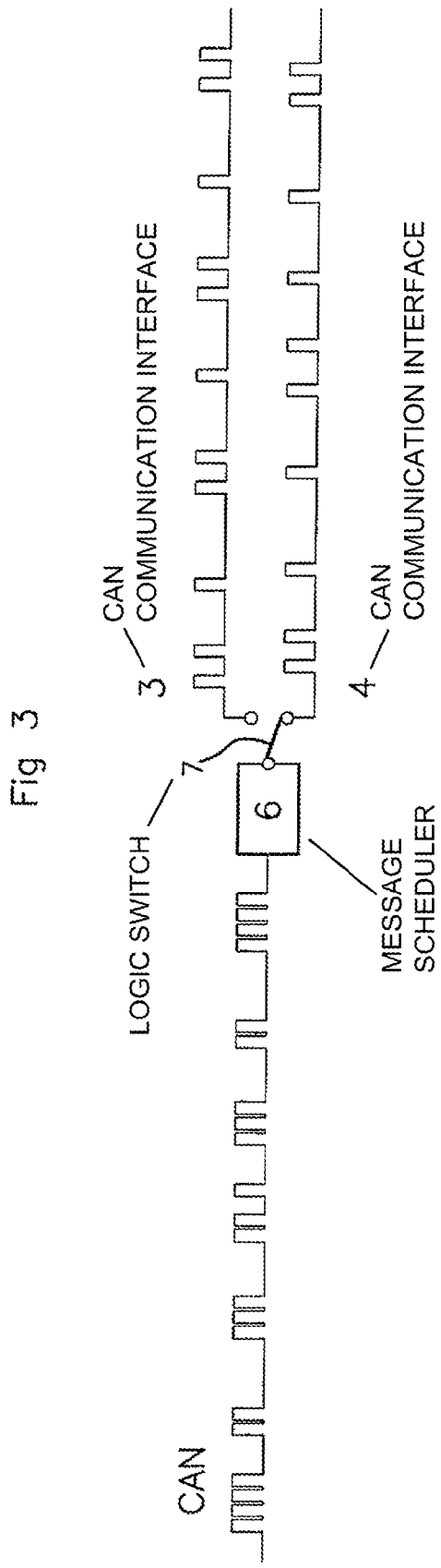

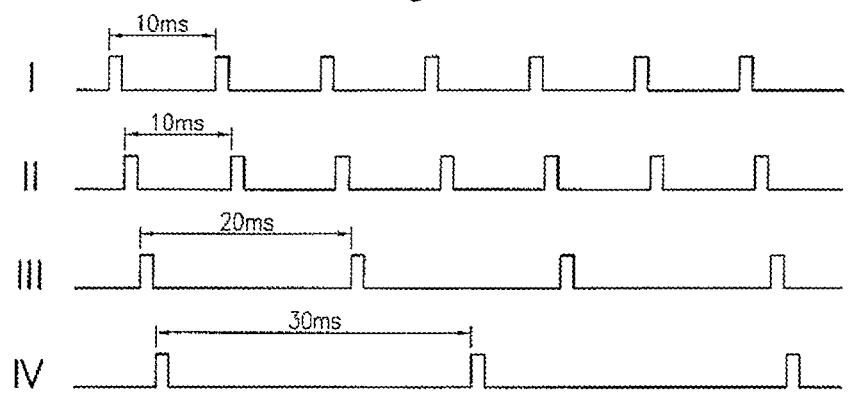
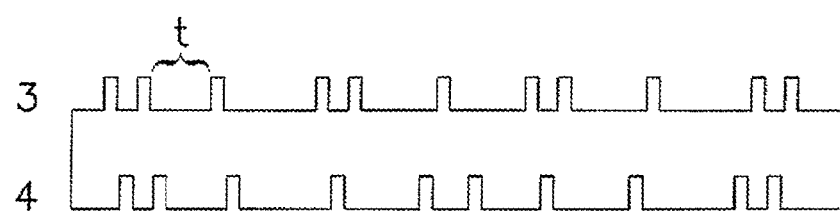
Fig 4a
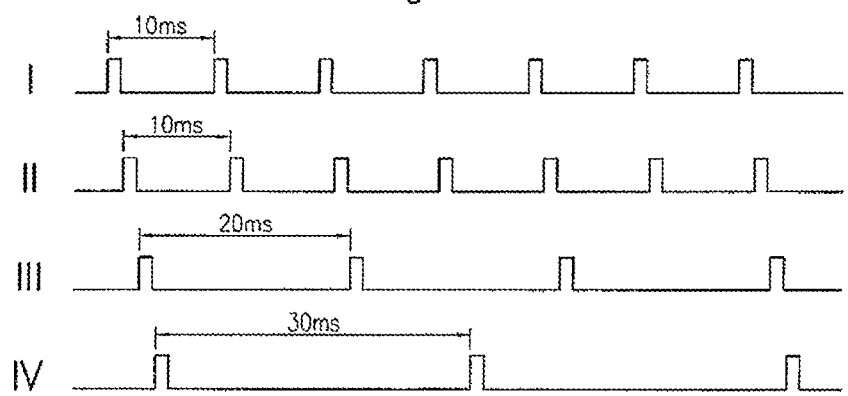
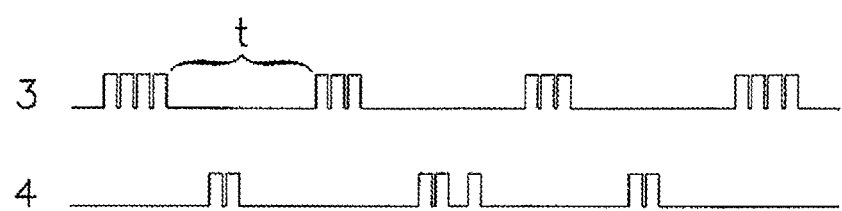
Fig 4b

METHOD FOR COMMUNICATION BETWEEN TWO AUTOMOTIVE ELECTRONIC CONTROL UNITS AND ASSOCIATED DEVICE

The invention relates to a method of communication between two electronic control units applicable to the automotive domain.

Communication between two or more automotive electronic control units is, for example, conducted by means of a communication interface using the CAN (controller area network) type communication protocol. The sending of messages from one electronic control unit to the other is conducted via a CAN bus, contained in a cable (called CAN line) linking the two electronic control units.

The main advantage of this communication protocol is that it enables several messages to be sent via a single CAN line to one or more electronic control units and containing, for example, parameters or commands for actuators of a system (engine, vehicle). In practice, previously, several wired communication lines were necessary, that is to say, as many wired lines as actuators to be controlled.

Other advantages of this CAN protocol are known (high message transmission speed, ease of diagnostic, etc.), and it is now widely used in the automotive world.

However, the major drawback in the use of a single CAN line containing messages specific to a number of actuators or containing a number of parameters, is that, when this communication interface is defective, no message can be sent, or received. The actuators of the system (engine, vehicle) whose operation depends on this communication then become inoperative. Even though this situation is rare, the CAN lines being increasingly reliable, the consequences of such a failure can be dramatic and can cause, for example, the untimely stopping of the vehicle when it is running.

A simple solution to this problem, known from the prior art EP 1 359 057 A2 and WO 85/03825 A1 is to duplicate this communication interface, that is to say, to use two CAN lines in parallel between the two automotive electronic control units. One is redundant and operates only when the other is defective, as described in the prior art EP 1 359 057 A2. Alternatively, the two communication interfaces can be used in permanent switch-over mode, that is to say, one or the other communication interface is selected according to its message transmission quality level at a given instant, as described in the prior art WO 85/03825 A1. The operation of a CAN line, the communication between the two electronic control units and the normal operation of the vehicle are therefore ensured, even in case of failure or a drop in the message transmission quality of one of the two CAN lines.

Unfortunately, given the high cost of a CAN line, and the low probability of a failure, this redundant device which offers no additional functionality other than in the event of a failure of one of the two CAN lines, is not used.

The present invention therefore proposes to remedy this problem by ensuring the communication between the two electronic control units in the event of a defective CAN line while benefiting from an additional functionality due to the presence of a second CAN line.

The aims of the invention are achieved by means of a method of communication between at least two automotive electronic control units, comprising two communication interfaces between the electronic control units enabling messages to be sent via one or the other of the communication interfaces, said electronic control units each comprising a microcontroller linked to the communication interfaces managing the sending and receiving of the messages via these communication interfaces according to a given priority level, transmission speed and recurrence, and comprising:
 a diagnostic system in order to check the functionality of the communication interfaces,
 a message scheduler,
the method being characterized in that it comprises the following steps:
 step 1: introduction of a logic switch into each microcontroller, controlled by the message scheduler, and connected to the communication interfaces, enabling one or the other of the communication interfaces to be selected,
 step 2: checking by the diagnostic system of a microcontroller that neither of the two communication interfaces is defective,
 step 3: scheduling by the message scheduler of the sending of the messages in succession via one or the other of the two communication interfaces, with a transmission speed greater than that of a single communication interface,
 step 4: selection by means of the logic switch of one or the other of the two communication interfaces in order to send the messages scheduled by the message scheduler,
 step 5: sending of the scheduled messages in succession by one or the other of the two communication interfaces.

Advantageously in the case of a method of communication between two electronic control units, the transmission speed between the two electronic control units, established in step 3, is two times greater than that of a single communication interface.

The invention also proposes that if, during step 1, the diagnostic system of a microcontroller diagnoses a communication interface as defective, then during step 3, the scheduling by the message scheduler of the sending of the messages is done via the non-defective communication interface.

Similarly, when an interface is defective, step 4 consists in the selection of the non-defective communication interface by means of the logic switch in order to send the messages scheduled by the message scheduler. Then, during step 5, the messages are sent via the non-defective communication interface.

In one embodiment, when a communication interface is defective, the scheduling of the messages performed in step 3 includes the establishment of a new priority for the messages by the message scheduler.

In a second embodiment, when a communication interface is defective, the scheduling of the messages performed in step 3 includes the establishment of a new reduced transmission speed for the messages by the message scheduler.

In a third embodiment, the priority of the messages is modified via the recurrence of the messages.

Generally, the communication interfaces consist of CAN-type buses.

The invention also relates to any communication device implementing the method presenting any one of the preceding characteristics.

Thus, the invention applies to any electronic control unit including the communication device according to the invention.

Other features and advantages of the invention will become apparent from reading the following description, given as a nonlimiting example, and from studying the appended drawings in which:

FIG. 1 is a schematic representation of the communication device between two automotive electronic control units according to the invention, FIG. 2 is a schematic view illustrating the method of communication between two automotive electronic control units according to the invention, FIG. 3 is a schematic representation illustrating the sending of messages according to the invention, FIG. 4a is a schematic representation illustrating a first example of the sending of messages according to the invention, FIG. 4b is a schematic representation illustrating a second example of the sending of messages according to the invention.

A communication device between two automotive electronic control units is illustrated in FIG. 1. An electronic control unit 1 is linked to an electronic control unit 2 via two communication interfaces 3, 4 of CAN bus type. To enable the communication, each electronic control unit 1, 2 includes a microcontroller 5 managing the sending and receiving of the messages by these communication interfaces 3, 4.

For this, each microcontroller 5 is equipped with a message scheduler 6 (cf. FIG. 1) which schedules the sending of the messages over the two communication interfaces 3, 4 according to a given priority level, transmission speed and recurrence. The transmission speed over the two communication interfaces 3, 4 is common to all the messages and is set by the CAN standard (around 125 to 500 kBauds). However, each message has a given priority level and recurrence (10 ms, 20 ms, 30 ms, etc.). For example, the diagnostic messages have a priority and a recurrence that are higher than the messages controlling the operation of an actuator.

Each microcontroller 5 comprises, for the sending of the messages over each communication interface 3, 4, two transmitters 6a, 6c, then for the receiving of the messages, two receivers 6b, 6d. Each communication interface 3, 4 of CAN bus type consists of a pair of cables wound one over the other (cf. FIG. 1, cables not referenced), one cable being linked, at a first end, to one of the two transmitters 6a, 6c of an electronic control unit 1, 2 and at the other end, to one of the two receivers, respectively 6b and 6d of the other electronic control unit 1, 2. Obviously, the transmitters 6a and 6c may also be respectively connected to the receivers 6d and 6c, with the two wound cables thus crossing. Thus, the messages sent by one electronic control unit 1, 2 are received by the other 1, 2 via one of the wound cables.

Each microcontroller 5 is also provided with a diagnostic system 8 (cf. FIG. 1) which constantly checks the state of the communication interfaces 3, 4 in order to detect as quickly as possible if one of the communication interfaces 3, 4 is defective and thus to alert the microcontroller 5. Said microcontroller can then trigger appropriate actions, such as warning the driver or placing the vehicle in degraded mode, that is to say, reducing its maximum speed for example.

According to the invention, each microcontroller 5 also includes a logic switch (cf. FIG. 1) linked to the two communication interfaces 3, 4 and controlled by the message scheduler 6. This logic switch 7 enables one or the other of the communication interfaces 3, 4 to be selected according to the command from the message scheduler 6. It is linked to the communication interfaces 3, 4 at the level of their respective transmitter 6a, 6c. It can thus allow messages to be sent over one or the other of the communication interfaces 3, 4 by selecting the appropriate transmitter 6a, 6c.

The method of communication between the two electronic control units 1, 2 is illustrated in FIG. 2. Firstly, the diagnostic system 8 checks the state of the communication interfaces 3, 4 (cf. FIG. 2, step 100).

If it detects no failed communication interface 3, 4, the message scheduler 6 schedules the successive sending of the messages over one or the other of the communication interfaces 3, 4 (cf. FIG. 2, step 210).

This scheduling may be arbitrary or follow a precise logic: for example, the messages may be scheduled so as not to sporadically overload the communication interfaces 3, 4. As illustrated in FIG. 4a, a succession of messages I, II, III, IV of different recurrences (respectively 10 ms, 10 ms, 20 ms and 30 ms) must be sent. The message scheduler 6 schedules the sending of the messages over the two communication interfaces 3 and 4 by alternating the messages according to the following order: I, III over the first interface 3 and II, IV over the second interface 4. This enables the messages to be distributed over the two communication interfaces 3, 4 in a relatively uniform way with no risk of sporadic overload (cf. FIG. 4a). Alternatively, the sending can be done by groups of messages. As illustrated in FIG. 4b, the message scheduler 6 has scheduled the sending of the messages over the two communication interfaces 3 and 4 by grouping them as follows: I, II, III, IV in succession over each of the two communication interfaces 3 and 4. This has the disadvantage of sporadically overloading the communication interfaces 3, 4 but makes it possible to increase the recurrence of the messages more easily, because of the greater time delay (t) (cf. FIGS. 4a and 4b) left between two successive groups of messages.

When the scheduling is finished, the logic switch 7, controlled by the message scheduler 6, selects one or the other of the communication interfaces 3, 4 (cf. FIG. 2, step 220), in order to send the messages according to the scheduling performed. Then, the successive sendings are done (cf. FIG. 2, step 230).

If the diagnostic system 8 detects a communication interface 3, 4 as defective, it notifies the message scheduler 6 thereof. The latter proceeds with a new scheduling of the messages (cf. FIG. 2, step 110), taking into account the failure of a communication interface 3, 4, that is to say that it schedules the sending of all the messages only over the communication interface 3, 4 that has not failed.

A variant of the invention consists in setting up a new message transmission speed (cf. FIG. 2, step 110a). In practice, previously, when the communication interfaces 3, 4 were in perfect working order, the messages were sent with a given fixed speed over each communication interface 3, 4 and greater than the transmission speed of a single CAN line. The two communication interfaces 3, 4 were together able to send up to two times more messages than just one, that is to say at two times 125 kBauds or two times 500 kBauds. As illustrated in FIG. 3, the messages to be sent are divided up by the message scheduler 6 over the two communication interfaces 3 and 4, then sent, by means of the logic switch 7. The recurrence of the sending of the messages over these two communication interfaces 3, 4 can be increased with no risk of overloading them. However, in the event of failure of one of the two communication interfaces, this same quantity of messages cannot be sent over a single CAN communication interface because it would be completely saturated. By sending the messages over a single communication interface 3, 4, as opposed to two, the quantity of messages per unit of time must therefore be divided by two so as not to saturate this communication interface. Consequently, the speed of transmission of the messages by the message scheduler is reduced (cf. FIG. 2, step 110a) to be adapted to the possible transmission speed over a single communication interface 3, 4 and reduce, as explained above, the quantity of messages sent.

Furthermore, certain urgent or important messages, which were sent previously with a higher transmission speed, such as the diagnostic messages, must continue to be sent as a priority. The lowering of the transmission speed is therefore compensated by reassigning a new priority to the message (cf. FIG. 2, step 110b). This priority can be modified by the recurrence of the messages. In fact, the more recurrent a message is, that is to say, the higher its recurrence, the more important it is.

Once this scheduling is performed, the logic switch 7 controlled by the message scheduler 6 selects the communication interface 3, 4 which has not failed (cf. FIG. 2, step 120), and the messages are sent with the new transmission speed and their new priority (cf. FIG. 2, step 130).

The method of communication between two electronic control units therefore comprises the following steps:

step 1: introduction of a logic switch 7 into each microcontroller 5, controlled by the message scheduler 6, and connected to the communication interfaces 3, 4, enabling one or the other of the communication interfaces 3, 4 to be selected, step 2: checking, by the diagnostic system 8, of any one of the microcontrollers 5, that neither of the two communication interfaces 3, 4 is defective, step 3: scheduling, by the message scheduler 6, of the sending of the messages in succession via one or the other of the two communication interfaces 3, 4, according to a transmission speed greater than that of a single communication interface 3, 4, step 4: selection, by means of the logic switch 7, of one or the other of the two communication interfaces 3, 4 in order to send the messages scheduled by the message scheduler 6, step 5: sending of the scheduled messages in succession by one or the other of the two communication interfaces 3, 4.

If, during step 2, the diagnostic system reveals a defective communication interface 3, 4, then the communication method includes the following new steps, instead of steps 3, 4, 5:

step 3: scheduling, by the message scheduler 6, of the sending of the messages between the two electronic control units 1, 2 via the non-defective communication interface 3, 4.

step 4: selection of the non-defective communication interface 3, 4 by means of the logic switch 7 in order to send the messages scheduled by the message scheduler 6, step 5: sending of the messages by the non-defective communication interface 3, 4.

The invention therefore makes it possible to maintain the communication between two automotive electronic control units, even when one of the two communication interfaces is defective, and to benefit from the presence of the two communication interfaces during normal operating conditions, by sending two times more messages than with a single communication interface with no risk of overload.

Obviously, the invention is not limited to the embodiment described and represented which has been given purely as an example.

This invention can be applied to a number of electronic control units, for example to three interconnected electronic control units, or to all the electronic control units present on one and the same communication network.

LIST OF REFERENCES USED (1): ECU A
(2): ECU B
(3): CAN LINE 1
(4): CAN LINE 2
(5): MICROCONTROLLER
(6): SCHEDULER
(6a): Transmitter 1
(6b): Receiver 1
(6c): Transmitter 2
(6d): Receiver 2
(7): Switch
(8): Diagnostic system

The invention claimed is:

1. A method of communication between two automotive electronic control units (1, 2), comprising i) two communication interfaces (3, 4) between the electronic control units (1, 2) enabling messages to be sent via one or the other of the communication interfaces (3, 4), ii) a microcontroller (5) linked to the communication interfaces (3, 4) managing the sending and receiving of the messages via these communication interfaces (3, 4) according to a given priority level, transmission speed and recurrence, iii) a diagnostic system (8) for checking the functionality of the communication interfaces (3, 4), iv) a message scheduler (6), and v) a logic switch (7) connected to the microcontroller (5), controlled by the message scheduler (6), and connected to the communication interfaces (3, 4), enabling one or the other of the communication interfaces (3, 4) to be selected, said method comprising:

a first step (100) of the diagnostic system (8) checking that neither of the two communication interfaces (3, 4) is defective;

a second step (210, 110, 110a, 110b) of the message scheduler (6) scheduling sending of the messages in succession via at least one of the two communication interfaces (3, 4), wherein, when in the first step the diagnostic system (8) detects that neither of the two communication interfaces (3, 4) is defective, i) the message scheduler (6) schedules (210) the individual sending of the messages over both of the two communication interfaces (3, 4) by alternating between the two communication interfaces (3, 4), or ii) the message scheduler (6) schedules the sending of the messages, in groups, over both of the two communication interfaces (3, 4) by alternating groups of the messages between the two communication interfaces (3, 4), and when in the first step the diagnostic system (8) detects that one of the two communication interfaces (3, 4) is defective, the message scheduler (6) schedules (110, 110a, 110b) the sending of all the messages only over the communication interface (3, 4) that the diagnostic system (8) detected has not failed;

a third step (220, 120) of the logic switch (7) selecting at least one of the two communication interfaces (3, 4) in order to send the messages as scheduled by the message scheduler (6), wherein, i) when the message scheduler (6) has scheduled (210) the individual sending of the messages over both of the two communication interfaces (3, 4) by alternating between the two communication interfaces (3, 4), the logic switch (7) switches between selecting a first of the two communication interfaces (3) and selecting a second of the two communication interfaces (4) so that alternatingly a first message is sent over the first communication interface (3) and a second message is sent over the second communication interface (4), ii) when the message scheduler (6) has scheduled (210) the sending of the messages over both the two communication interfaces (3, 4) by alternating groups of the messages between the two communication interfaces (3, 4), the logic switch (7) switches between selecting the first of the two communication interfaces (3) and selecting the second of the two communication interfaces (4) so that the first and second messages are sent as a plurality of groups, the groups being alternately sent over the first communication interface (3) and over the second communication interface (4), and iii) when the message scheduler (6) has scheduled (110, 110a, 110b) the sending of all the messages only over the communication interface (3, 4) that the diagnostic system (8) detected has not failed, the logic switch (7) selects the communication interface (3, 4) that the diagnostic system (8) detected has not failed for sending all the messages; and a fourth step of sending each of messages over a currently selected of the two communication interfaces (3, 4).

2. The communication method as claimed in claim 1, wherein, when during the first step, the diagnostic system (8) of a microcontroller (5) diagnoses the first (3) that the two communication interfaces (3, 4) as defective, in the second step, the message scheduler (6) schedules (110) the sending of all the messages only over the second communication interface (4) that the diagnostic system (8) detected has not failed, and in the third step, the logic switch (7) selects the second communication interface (3) that the diagnostic system (8) detected has not failed for sending all the messages; and in the fourth step, each of messages is send only over the second communication interface (4).

3. The communication method as claimed in claim 2, wherein, the second step (110b) of the message scheduler (6) scheduling sending of the messages includes establishment of a new priority for the messages by the message scheduler (6).

4. The communication method as claimed in claim 3, wherein, the second step (210) of the message scheduler (6) scheduling sending of the messages, the priority of the messages is modified via the recurrence of the messages.

5. The communication method as claimed in claim 2, wherein, the second step (110a) of the message scheduler (6) scheduling sending of the messages includes establishment of a new reduced transmission speed for the messages by the message scheduler (6).

6. The communication method as claimed in claim 1, wherein the communication interfaces (3, 4) comprise CAN-type buses.

7. The communication method as claimed in claim 1, wherein, in said second step (210) of the message scheduler (6) scheduling sending of the messages, the message scheduler (6) schedules sending of the messages in succession via both of the two communication interfaces (3, 4) with a transmission speed between the two electronic control units (1, 2) up to two times greater than a transmission speed of a single one of the two communication interfaces (3, 4).

8. A method of communication between two automotive electronic control units (1, 2), comprising two communication interfaces (3, 4) between the electronic control units (1, 2) enabling messages to be sent via one or the other of the communication interfaces (3, 4), said electronic control units (1, 2) each further comprising i) a microcontroller (5) linked to the communication interfaces (3, 4) managing the sending and receiving of the messages via these communication interfaces (3, 4) according to a given priority level, transmission speed and recurrence, ii) a diagnostic system (8) for checking the functionality of the communication interfaces (3, 4), iii) a message scheduler (6), and iv) a logic switch (7) connected to the microcontroller (5), controlled by the message scheduler (6), and connected to the communication interfaces (3, 4), enabling one or the other of the communication interfaces (3, 4) to be selected, said method comprising:

a first step (100) of the diagnostic system (8) checking that neither of the two communication interfaces (3, 4) is defective;

a second step (210, 110, 110a, 110b) of the message scheduler (6) scheduling sending of the messages in succession via at least one of the two communication interfaces (3, 4), wherein, i) in a first situation the message scheduler (6) schedules (110, 110a, 110b, 210) the sending of all the messages only over one of the two the communication interfaces, and ii) in a second situation the message scheduler (6) schedules (210) the sending of the messages over both of the two communication interfaces (3, 4);

a third step (220, 120) of the logic switch (7) selecting at least one of the two communication interfaces (3, 4) in order to send the messages as scheduled by the message scheduler (6); and a fourth step of sending each of messages over a currently selected of the two communication interfaces (3, 4).

9. The communication method as claimed in claim 8, wherein, in said second step (210) of the message scheduler (6) scheduling sending of the messages, the message scheduler (6) schedules sending of the messages in succession via both of the two communication interfaces (3, 4) with a transmission speed between the two electronic control units (1, 2) up to two times greater than a transmission speed of a single one of the two communication interfaces (3, 4).

10. The communication method as claimed in claim 9, wherein, the second situation includes when the diagnostic system (8) detects that neither of the two communication interfaces (3, 4) is defective, in the second situation, i) the message scheduler (6) schedules (210) the individual sending of the messages over both of the two communication interfaces (3, 4) by alternating between the two communication interfaces (3, 4), or ii) the message scheduler (6) schedules the sending of the messages, in groups, over both of the two communication interfaces (3, 4) by alternating groups of the messages between the two communication interfaces (3, 4), when the message scheduler (6) has scheduled (210) the individual sending of the messages over both of the two communication interfaces (3, 4) by alternating between the two communication interfaces (3, 4), the logic switch (7) switches between selecting a first of the two communication interfaces (3) and selecting a second of the two communication interfaces (4) so that alternatingly a first message is sent over the first communication interface (3) and a second message is sent over the second communication interface (4), when the message scheduler (6) has scheduled (210) the sending of the messages over both the two communication interfaces (3, 4) by alternating groups of the messages between the two communication interfaces (3, 4), the logic switch (7) switches between selecting the first of the two communication interfaces (3) and selecting the second of the two communication interfaces (4) so that the first and second messages are sent as a plurality of groups, the groups being alternately sent over the first communication interface (3) and over the second communication interface (4), and in said second step (210) of the message scheduler (6) scheduling sending of the messages, the message scheduler (6) schedules sending of the messages in succession via both of the two communication interfaces (3, 4) with a transmission speed between the two electronic control units (1, 2) up to two times greater than a transmission speed of a single one of the two communication interfaces (3, 4).

11. The communication method as claimed in claim 10, wherein, the first situation includes when the diagnostic system (8) detects that one of the two communication interfaces (3, 4) is defective, in the first situation the message scheduler (6) schedules (110, 110a, 110b) the sending of all the messages only over the communication interface (3, 4) that the diagnostic system (8) detected has not failed, and in the third step, when the message scheduler (6) has scheduled (110, 110a, 110b) the sending of all the messages only over the communication interface (3, 4) that the diagnostic system (8) detected has not failed, the logic switch (7) selects the communication interface (3, 4) that the diagnostic system (8) detected has not failed for sending all the messages.

12. The communication method as claimed in claim 10, wherein, the second step (110b) of the message scheduler (6) scheduling sending of the messages includes establishment of a new priority for the messages by the message scheduler (6).

13. The communication method as claimed in claim 12, wherein, the second step (210) of the message scheduler (6) scheduling sending of the messages, the priority of the messages is modified via the recurrence of the messages.

14. The communication method as claimed in claim 10, wherein, the second step (110a) of the message scheduler (6) scheduling sending of the messages includes establishment of a new reduced transmission speed for the messages by the message scheduler (6).

15. The communication method as claimed in claim 9, wherein, the second situation includes when the diagnostic system (8) detects that neither of the two communication interfaces (3, 4) is defective, in the second situation, the message scheduler (6) schedules (210) the individual sending of the messages over both of the two communication interfaces (3, 4) by alternating between the two communication interfaces (3, 4), when the message scheduler (6) has scheduled (210) the individual sending of the messages over both of the two communication interfaces (3, 4) by alternating between the two communication interfaces (3, 4), the logic switch (7) switches between selecting a first of the two communication interfaces (3) and selecting a second of the two communication interfaces (4) so that alternatingly a first message is sent over the first communication interface (3) and a second message is sent over the second communication interface (4).

16. The communication method as claimed in claim 9, wherein, the second situation includes when the diagnostic system (8) detects that neither of the two communication interfaces (3, 4) is defective, in the second situation, the message scheduler (6) schedules the sending of the messages, in groups, over both of the two communication interfaces (3, 4) by alternating groups of the messages between the two communication interfaces (3, 4), when the message scheduler (6) has scheduled (210) the sending of the messages over both the two communication interfaces (3, 4) by alternating groups of the messages between the two communication interfaces (3, 4), the logic switch (7) switches between selecting the first of the two communication interfaces (3) and selecting the second of the two communication interfaces (4) so that the first and second messages are sent as a plurality of groups, the groups being alternately sent over the first communication interface (3) and over the second communication interface (4).

17. The communication method as claimed in claim 8, wherein the communication interfaces (3, 4) comprise CAN-type buses.

18. A communication device, comprising:

two automotive electronic control units (1, 2), each of said electronic control units (1, 2) comprising i) two communication interfaces (3, 4), the two communication interfaces (3, 4) enabling messages to be sent between the two electronic control units (1, 2) by the messages being sent via one or the other of the communication interfaces (3, 4) of each of the two electronic control units (1, 2), ii) a microcontroller (5) linked to the communication interfaces (3, 4) managing the sending and receiving of the messages via these communication interfaces (3, 4) according to a given priority level, transmission speed and recurrence, iii) a diagnostic system (8) that checks the functionality of the communication interfaces (3, 4), iv) a message scheduler (6), and iv) a logic switch (7) connected to the microcontroller (5), controlled by the message scheduler (6), and connected to the communication interfaces (3, 4), the logic switch (7) enabling one or the other of the communication interfaces (3, 4) to be selected, wherein, the diagnostic system (8) checks that neither of the two communication interfaces (3, 4) is defective, the message scheduler (6), responsive to the diagnostic system, schedules sending of the messages in succession via at least one of the two communication interfaces (3, 4), i) in a first situation the message scheduler (6) schedules (110, 110a, 110b, 210) the sending of all the messages only over one of the two the communication interfaces, and ii) in a second situation the message scheduler (6) schedules (210) the sending of the messages over both of the two communication interfaces (3, 4);

the logic switch (7), under control of the message scheduler (6), selects at least one of the two communication interfaces (3, 4) in order to send the messages as scheduled by the message scheduler (6); and the two communication interfaces (3, 4) sending each of messages to the other automotive electronic control units (1, 2).

19. The communication device as claimed in claim 18, wherein the communication interfaces (3, 4) comprise CAN-type buses.

20. The communication device as claimed in claim 19, wherein, the second situation includes when the diagnostic system (8) detects that neither of the two communication interfaces (3, 4) is defective, in the second situation, i) the message scheduler (6) schedules (210) the individual sending of the messages over both of the two communication interfaces (3, 4) by alternating between the two communication interfaces (3, 4), or ii) the message scheduler (6) schedules the sending of the messages, in groups, over both of the two communication interfaces (3, 4) by alternating groups of the messages between the two communication interfaces (3, 4), when the message scheduler (6) has scheduled (210) the individual sending of the messages over both of the two communication interfaces (3, 4) by alternating between the two communication interfaces (3, 4), the logic switch (7) switches between selecting a first of the two communication interfaces (3) and selecting a second of the two communication interfaces (4) so that alternatingly a first message is sent over the first communication interface (3) and a second message is sent over the second communication interface (4), when the message scheduler (6) has scheduled (210) the sending of the messages over both the two communication interfaces (3, 4) by alternating groups of the messages between the two communication interfaces (3, 4), the logic switch (7) switches between selecting the first of the two communication interfaces (3) and selecting the second of the two communication interfaces (4) so that the first and second messages are sent as a plurality of groups, the groups being alternately sent over the first communication interface (3) and over the second communication interface (4), and in said second step (210) of the message scheduler (6) scheduling sending of the messages, the message scheduler (6) schedules sending of the messages in succession via both of the two communication interfaces (3, 4) with a transmission speed between the two electronic control units (1, 2) up to two times greater than a transmission speed of a single one of the two communication interfaces (3, 4).

\* \* \* \* \*

UNITED STATES PATENT AND TRADEMARK OFFICE
CERTIFICATE OF CORRECTION

PATENT NO. : 8,554,406 B2  Page 1 of 1
APPLICATION NO. : 13/147685
DATED : October 8, 2013
INVENTOR(S) : Philippe Avian It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 120 days.

Signed and Sealed this

Fifteenth Day of September, 2015

Michelle K. Lee
*Director of the United States Patent and Trademark Office*